Oct. 29, 1963    R. B. WINNER    3,108,696
DISPLAY DEVICE FORMED OF REINFORCED FLUTED MATERIAL
Filed July 17, 1961    3 Sheets-Sheet 1
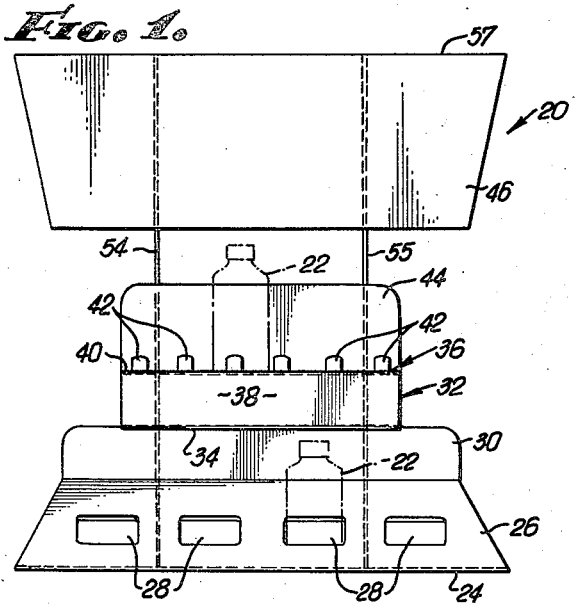
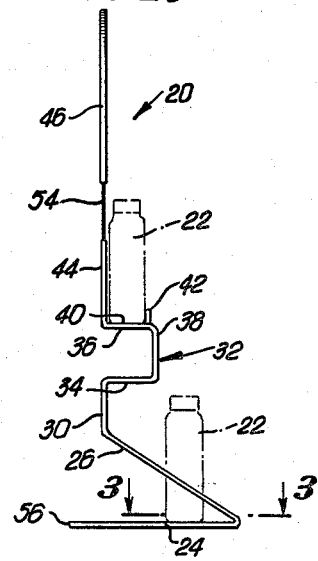
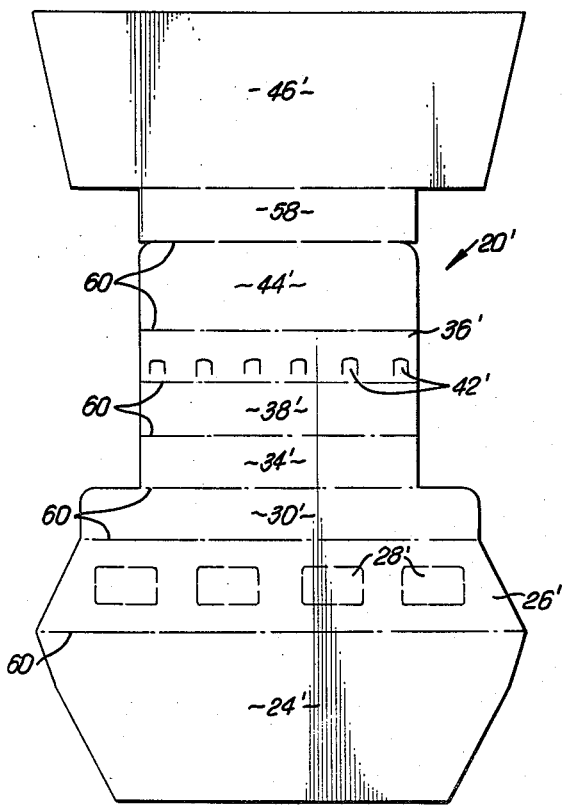
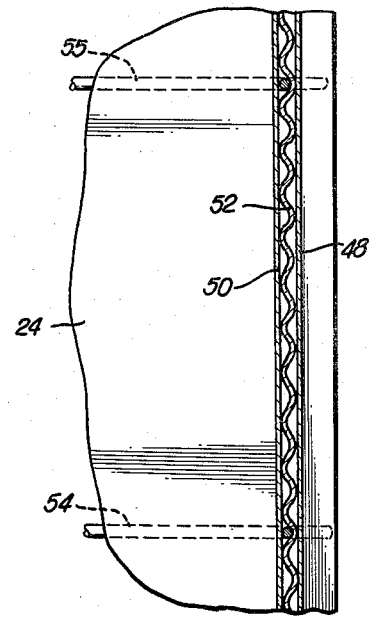
INVENTOR.
ROY B. WINNER
BY
ATTORNEY.

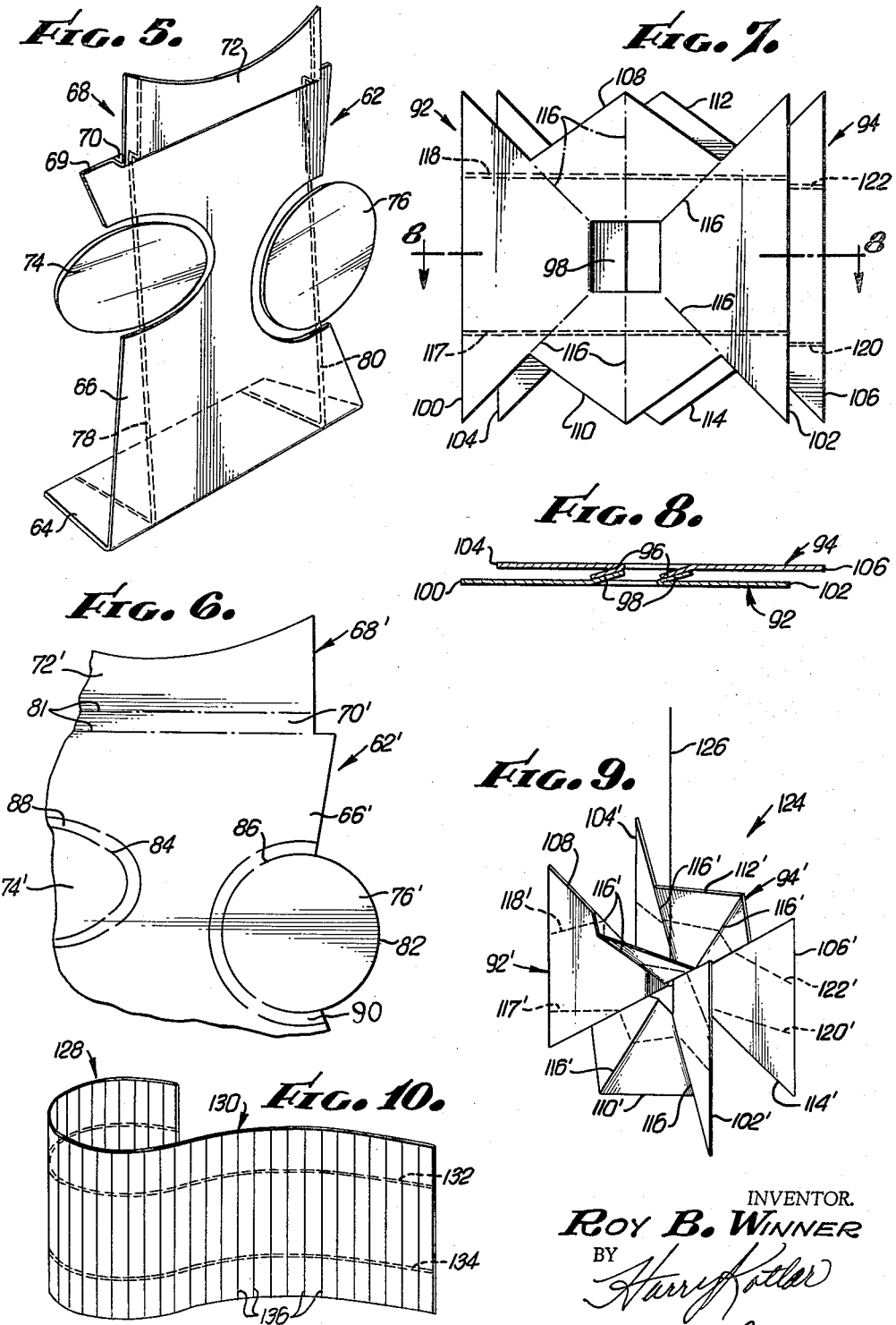

Oct. 29, 1963 R. B. WINNER 3,108,696
DISPLAY DEVICE FORMED OF REINFORCED FLUTED MATERIAL
Filed July 17, 1961 3 Sheets-Sheet 3
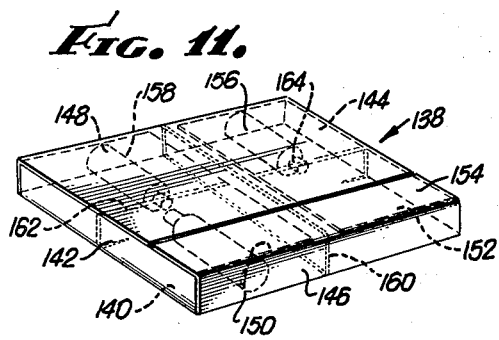
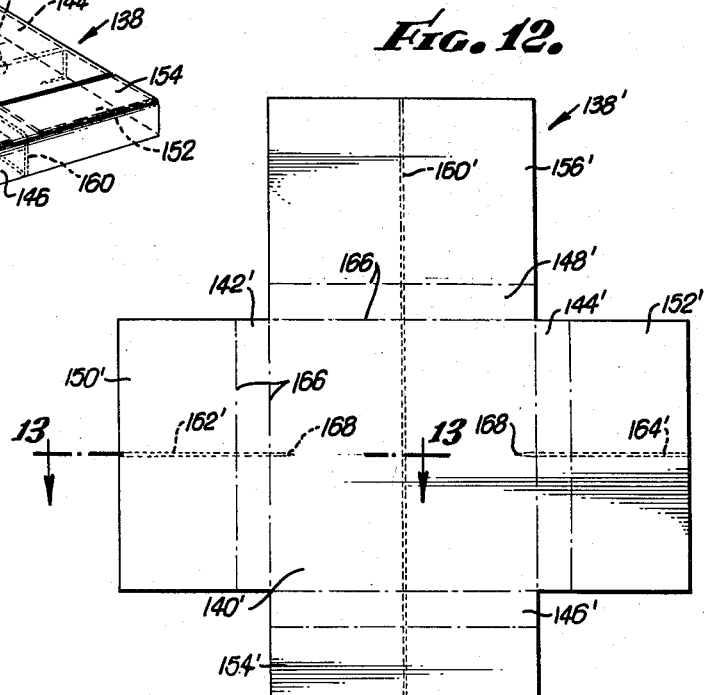
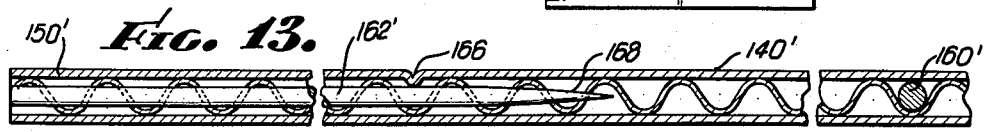
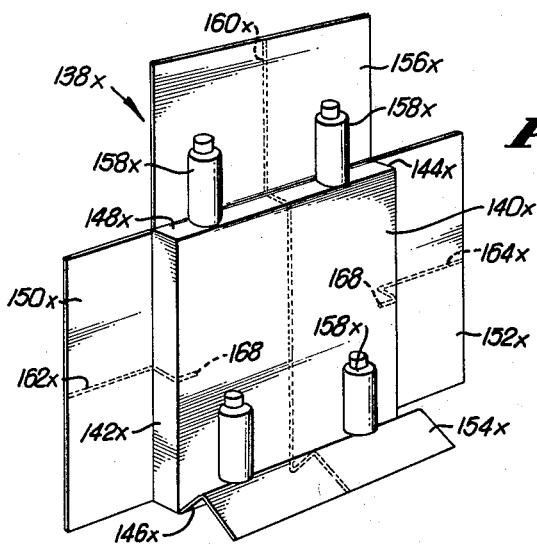
INVENTOR.
ROY B. WINNER
BY
ATTORNEY.

United States Patent Office 3,108,696
Patented Oct. 29, 1963

3,108,696
DISPLAY DEVICE FORMED OF REINFORCED
FLUTED MATERIAL
Roy B. Winner, Los Angeles, Calif.
(4243 Mary Ellen St., Studio City, Calif.)
Filed July 17, 1961, Ser. No. 124,408
6 Claims. (Cl. 211—73)

The present invention relates to reinforced fluted material, and more particularly to displays formed from such material and which provide dimensional shapes.

Dimension displays are well-known in the prior art. Such displays have been used for purposes such as, for example, counter displays, counter merchandisers, window displays, etc. The construction of displays of this type has, however, in the past usually involved a number of expensive and time-consuming operations. In order to create the dimensional shapes, it has usually been necessary to have the display unit assembled by a manufacturer. Expensive and often comparatively heavy materials of construction have usually been required, in order to impart to the display the necessary rigidity and strength. Depending upon the structural materials used, various methods have been employed in order to secure together various elements (e.g., easels, wings, etc.) making up the dimensional shapes. Thus, it has been found necessary to nail, staple, glue, hook or employ other similar means for this purpose.

It is therefore an object of the present invention to provide an improved dimensional display unit.

Another object of the invention is to provide a dimensional display unit adapted for assembly by a merchandiser or dealer, as well as by the display unit manufacturer.

Another object of the present invention is to provide a dimensional display unit which can be constructed at a cost which is substantially lower than that heretofore required.

Another object of the invention is to provide a dimensional display unit which can be assembled in a much shorter time than has heretofore been required.

Another object of the invention is to provide a dimensional display unit which eliminates the need for the use of special connecting means for securing together the elements thereof.

Another object of the invention is to provide a dimensional display unit of comparatively light weight.

Another object of the invention is to provide a dimensional display unit which can be given a desired dimensional shape merely by bending the elements thereof.

These and other objects of the invention will become more apparent from the following description thereof, read in conjunction with the accompanying drawings, in which:

FIG. 1 is a somewhat diagrammatic front elevation of a merchandiser constructed in accordance with the invention;

FIG. 2 is a side elevation of the merchandiser of FIG. 1, as viewed from the left side thereof;

FIG. 3 is a horizontal section taken along the lines 3—3 of FIG. 2;

FIG. 4 is a top plan of a form employed in the construction of the merchandiser of FIGS. 1 and 2;

FIG. 5 is a perspective of a dimensional display having rotatable elements, constructed in accordance with the invention;

FIG. 6 is a top plan of a form employed in the construction of the display of FIG. 5, being partly broken away;

FIG. 7 is a top plan of a pair of forms for the construction of a mobile in accordance with the invention;

FIG. 8 is a vertical section taken along the lines 8—8 of FIG. 7;

FIG. 9 is a perspective view of a mobile constructed from the forms of FIGS. 7 and 8, a length of cord for the suspension thereof being shown;

FIG. 10 is a perspective of a length of stock window trimming material, constructed in accordance with the invention;

FIG. 11 is a perspective of a book fold carton constructed in accordance with the invention;

FIG. 12 is a top plan of a form employed in the construction of the book fold carton of FIG. 11;

FIG. 13 is a vertical section taken along the lines 13—13 of FIG. 12, enlarged and partly broken away; and FIG. 14 is a perspective view of a merchandiser constructed from the form of FIG. 12.

Referring to the drawings, and particularly to FIG. 1, a dimensional display unit in the form of a merchandiser 20 is shown, adapted to support merchandise such as bottles 22 shown in phantom (see also FIG. 2). The merchandiser 20 includes a base 24, from which rises a rearwardly-inclined merchandise support wall portion 26 having a plurality of openings 28 therethrough. A connector wall section 30 extends upwardly from the wall portion 26, and at its upper end merges with a forwardly-extending shelf 32 comprised of two superposed horizontal elements 34 and 36 connected at their respective forward ends by a vertical element 38. The upper horizontal element 36 provides a supporting shelf surface 40 for additional bottles 22, the latter being held in position at the forward end of the shelf 32 by means of a plurality of pop-outs 42. The shelf element 36 at its rearward end merges with a rear, upwardly-extending wall segment 44, the latter at its upper end being connected by means to be described below to an upper wall portion 46.

All of the above-mentioned structural parts or panels of the merchandiser 20 are constructed of corrugated board, such as of jute or kraft. As may be seen from FIG. 3, such board includes a face sheet 48, a back sheet 50, and fluting 52 therebetween. Two stiffener wires 54 and 55 extend through the fluting 52, and from the inner end 56 of the base 24 to the upper end 57 of the upper wall portion 46. Each of the stiffener wires 54 and 55 is of metal, such as, e.g., brass or cold-rolled steel. The diameter of each wire will, of course, depend upon the diameter of the fluting, and the desired degree of rigidity in the merchandiser 20. The wire may then, e.g., be 14 gauge for a C-flute corrugated board. It will be realized that the stiffener wires 54 and 55 serve to maintain the merchandiser 20 in rigid and upright position, although the latter is constructed basically of corrugated board, and must support the weight of the bottles 22; and although the opposite end panels represented by the base 24 and upper wall portion 46 are mutually spaced apart, and, in fact, project divergently from each other.

The face sheet 48 or back sheet 50 may bear any suitable advertising copy, decorative material, etc.

The merchandiser 20 is produced from a form 20' (FIG. 4) which is originally flat, and has been die-cut in accordance with the conventional procedure to provide the necessary shape and openings. Thus, the form 20' provides portions 24', 26', 30', 34', 36', 38', 44', and 46', respectively corresponding in shape and in base reference numeral designation to the above-described portions of the merchandiser 20. Also, die-cut openings 28' and pop-outs 42' are included in the form portions 26' and 36', respectively. A tear-out piece 58 is positioned between the form portions 44' and 46', and a score line 60 is present between each pair of adjacent form portions.

In order to assemble the merchandiser 20, two wires or rods (not shown), corresponding to the wires 54 and 55, respectively, are inserted through the fluting (not shown) of the form 20', at transversely-spaced apart positions, each of said wires extending for the full length of the form 20'. The form 20' having the wires extending therethrough is then bent manually along the score lines 60, so as to produce the shape of the merchandiser 20. Either before or after bending, the tear-out piece 58 may be removed by any conventional means. During the bending operation, the pop-outs 42' will automatically assume their desired final position shown at 42.

After being thus assembled, the merchandiser 20' is ready to be placed on a counter or in a store window, where it is desired to display the bottles 22, as well as in any other suitable display area.

Referring to FIG. 5, a dimensional display 62, particularly adapted for window display purposes is shown. The window display 62 includes a base 64, a wall section 66 extending upwardly from said base 64, and a top portion 68 secured to the upper edge 69 of the wall section 66. The top portion 68 comprises a horizontal element 70 extending forwardly from the edge 69, said element 70 merging at its forward end with an upwardly-extending element 72. The window display 62 also includes two rotatable components, positioned at opposite sides thereof: a circular component 74 at the right side; and an ovular component 76 at the left side.

The window display 62 is constructed of corrugated board as in the case of the merchandiser 20, and likewise includes two stiffener wires 78 and 80 extending through the fluting (not shown) of said board, and transversely-spaced apart a convenient distance.

It will be noted that the rotatable components 74 and 76 are supported for rotation entirely by the wires 78 and 80, respectively.

Referring to FIG. 6, part of the form 62' from which the window display 62 is assembled is shown. As in the case of the form 20', the form 62' is flat, and die-cut to provide the appropriate shape. The various portions of the form 62' are designated by reference numerals having the same base number as the respectively-corresponding portions of the window display 62. It will be noted that the portions 74' and 76' corresponding to the rotatable components 74 and 76, respectively, have circumferential edge portions extending outwardly from the wall section 66' (only the outer circumferential edge portion 82 of the component 76' being shown), and inner circumferential edge portions 84 and 86, respectively, positioned within the confines of the wall section 66'. Two tear-out pieces 88 and 90 border the circumferential edge portions 84 and 86, respectively. Score lines such as shown at 81 are provided between the portions of the form 62'.

When it is desired to assemble the window display 62, the wires 78 and 80 are inserted through the fluting (not shown) of the form 62', and the latter is then bent along the score lines 81, so as to provide the final desired shape. The tear-out pieces 88 and 90 may then be removed, and the rotatable components 74 and 76 remain suspended for rotation on the wires 78 and 80, respectively. The wires 78 and 80 also adapt the window display 62 for upright positioning, with the opposite end panels represented by the base 64 and upper element 72 being mutually spaced apart and projecting divergently from one another.

Here again, it will be understood that any desired advertising copy or decorative material may be placed on any of the surfaces of the window display 62.

Referring to FIGS. 7–9, the invention is illustrated as applied to the construction of a mobile. Here, two flat forms of corrugated board 92 and 94 are employed, said forms being initially placed in superposed position with respect to one another and secured together by means of two pairs of centrally located flaps 96 and 98, cut from the forms 92 and 94, respectively. Each flap 96 is secured to the opposite flap 98 by any conventional means. The forms 92 and 94 have corresponding straight parallel side edges 100, 102 and 104, 106, respectively. The forms 92 and 94 also have corresponding top and bottom edges 108, 110 and 112, 114, respectively, each of which is cut out along a number of lines angular to one another. Score lines are provided, as shown at 116.

The forms 92 and 94 are cut in such manner that the fluting thereof (not shown) extends from side to side. Consequently, when it is desired to assemble a mobile from said forms 92 and 94, two spaced-apart wires 117 and 118 may be inserted through the fluting of the form 92, and two similar wires 120 and 122 may be inserted through the fluting of the form 94. Each of the forms 92 and 94 may then be bent along the score lines 116, so as to produce a mobile 124, shown in FIG. 9. As may be seen, the mobile 124 provides a number of panels, including the opposite end panels adjacent the side edges 100, 102 and 104, 106, extending at various angles one to the other. A wire (not shown) may be secured between the inner flap 96 and the inner flap 98, so as to maintain the mobile portions 92' and 94' in their position of FIG. 9, and also to provide a means for suspending the mobile 124 through the use of a length of cord 126. It will again be understood that the surfaces of the mobile 124 may bear any desired advertising or decorative material.

Referring to FIG. 10, a stock material 128 adapted for window trimming purposes and constructed in accordance with the invention is illustrated. Here, a length of corrugated board 130 is employed similar to that employed in the embodiments of the invention of FIGS. 1–9. Two stiffener wires 132 and 134 extend longitudinally through the fluting (not shown) of the stock material 128. Parallel transversely-extending score lines 136 are provided throughout the length of the cardboard sheet 130, being spaced apart a short distance one from the other, and dividing the board 130 into a number of panels.

The sheet 130 may, for example, be provided with a plain colored surface on one or both sides thereof. It can then be cut to any desired length, and bent into any desired shape. If employed for window trimming purposes, it thus eliminates the need for preshaped background elements.

Referring to FIG. 11, a book fold carton 138 constructed in accordance with the invention is shown. The carton 138 is of corrugated board, and includes a bottom wall 140; two opposite, parallel extending side walls 142 and 144; two opposite, parallel extending end walls 146 and 148; two side flaps 150 and 152, associated with said side walls 142 and 144, respectively; and two end flaps 154 and 156 associated with said end walls 146 and 148, respectively. The end flaps 154 and 156 are maintained in closed position over the side flaps 150 and 152 by any conventional means such as cord or tape (not shown), and the carton 138 is thus adapted to contain merchandise such as, for example, bottles 158.

The carton 138 is reinforced by means of a stiffener wire 160 which extends through the fluting thereof, and also by means of two stiffener wires 162 and 164 which extend perpendicularly to the fluting. As may be seen, the wire 160 is positioned substantially midway between the side walls 142 and 144, and passes through the bottom wall 140; through the end walls 146 and 148; and through the end flaps 154 and 156. The wires 162 and 164, on the other hand, pass through the side flaps 150 and 152, as well as through the side walls 142 and 144, respectively, and portions of the bottom wall 140.

Referring to FIG. 12, a form 138' from which the carton 138 is produced is shown, including a central portion 140' of substantially rectangular shape; two opposite inner side portions 142' and 144' which merge with two outer side portions 150' and 152', respectively; and two opposite inner end portions 146' and 148' which merge with outer end portions 154' and 156', respectively. Score lines such as shown at 166 are located between the adjacent portions of the form 138'.

A stiffener wire 160' (see also FIG. 13) extends through the fluting of the form 138′, being located substantially midway between the side portions 142′ and 144′. Two substantially aligned stiffener wires 162′ and 164′, which are of comparatively short length, extend through the side portions 142′, 150′ and 144′, 152′, respectively, and are located approximately midway between the end edges of the latter. As may be seen most clearly from FIG. 13 (in the case of the wire 162′), each of the wires 162′ and 164′ is provided with a tapered inner end 168, and extends for a short distance, e.g., about one inch, from the respectively associated side portion 142′ or 144′ into the adjacent area of the center portion 140′.

The stiffener wire 160′ is inserted in the form 138′ in the same manner as in the case of the embodiments of the invention of FIGS. 1-8. However, as has been above-indicated, the wires 162′ and 164′ are inserted against the fluting. Such insertion may be accomplished manually, or by any suitable mechanical means, and is aided by the tapered shape of the inner wire ends 168.

It will be clear that the carton 138, when opened and the bottles 158 removed, can be reconverted to the shape of the form 138′. The latter is then adapted to be bent manually or by suitable mechanical means along the score lines 166 into the shape of a merchandiser 138ˣ (see FIG. 14). The merchandiser 138ˣ provides a somewhat inclined central upright wall 140ˣ, which is supported along its lower edge by means of two forwardly-projecting flaps 146ˣ and 154ˣ which are bent angularly to one another; and is supported at its side edges by means of two wings made up of angularly bent portions 142ˣ, 150ˣ and 144ˣ, 152ˣ, respectively. A flap 148ˣ projects rearwardly from the upper edge of the wall 140ˣ, and at its outer edge meets an upwardly extending upper wall portion 156ˣ. It will be understood that the flap 148ˣ might be somewhat rearwardly inclined, and that the wall portion 156ˣ might likewise be rearwardly inclined.

Any of the surfaces of the merchandiser 138ˣ may be provided with advertising or decorative material. As shown, the flaps 146ˣ and 148ˣ are each adapted to support merchandise such as the bottles 158ˣ, with the latter resting against the adjacent wall 140ˣ or wall portion 156ˣ. The merchandiser 138ˣ is thus able to maintain its shape and to support the weight of the merchandise, due to the stiffening action of the wires 160ˣ, 162ˣ and 164ˣ, and although the opposite end panels represented by the portions 150ˣ, 152ˣ, 154ˣ and 156ˣ project divergently with respect to each other.

It will be obvious that the product of the present invention is adapted to take many forms, and to be employed in many ways. Once the desired corrugated form has been produced, the stiffening wires may be inserted at any stage of production or marketing of the finished device. It should be emphasized here, that although at least two stiffener wires have been shown in each of the embodiments of FIGS. 1-14, a single wire may be adequate in some instances, and more than two wires may be desired in others. Any wires which do not pass through the fluting may run at any angle thereto.

The invention having thus been described with reference to particular embodiments thereof, it will be clear that various modifications may be made therein without departing from the spirit of the invention or the scope of the appended claims.

I claim:
1. A dimensional display, comprising a sheet of material having fluting therethrough, said sheet being formed with a plurality of score lines, said sheet being adapted to be bent along said score lines and into a predetermined shape providing said dimensional display with opposite end panels which are mutually spaced apart, said sheet further including a tear-out portion located in contact with said edge portion, and a stiffener wire extending through said fluting and through said component, every one of said score lines being intersected by said stiffener wire, said stiffener wire being adapted to maintain the form of said sheet when bent into said predetermined shape, said tear-out portion being adapted for removal from said sheet after bending into said predetermined shape, said component being adapted for rotation on said stiffener wire after said tear-out portion has been removed from said sheet.

2. An article of manufacture, comprising a sheet of material having fluting therethrough, said sheet being formed with a plurality of score line, said sheet being adapted to be bent along said score lines and into a carton, said sheet being further adapted to be bent along said score lines and into a merchandiser having opposite end panels which are mutually spaced apart providing at least one merchandise support shelf and at least one sideward projecting flap, a first stiffener wire extending through said fluting and adapted to stiffen each of said shelves, and a second stiffener wire extending angularly to said fluting and adapted to stiffen a side flap, when said sheet is bent into the shape of said merchandiser, every one of said score lines being intersected by a stiffener wire.

3. An article of the class described comprising a sheet of originally flat material having opposed surfaces, said material having at least one non-resilient wire extending therethrough intermediate its opposed surfaces, a portion of said material serving as a base and another part of the material serving as a display portion adapted to have design material formed thereon for attracting attention, and at least one tear out portion intermediate the base portion and the display portion, said base portion and the said non-resilient wire bent at a pre-determined angle to the tear out portion and the display portion whereby when the tear out portion is removed said at least one non-resilient wire will hold the display portion in spaced relation and in a direction the wire extends with respect to the base portion supported only by a portion of the said at least one non-resilient wire.

4. The article described in claim 3 wherein the display portion is supported in vertically spaced relation to the base portion and said pre-determined angle is selected so the base portion will serve as a stand for the display portion and hold it in a generally erect position without further support.

5. An article of the class described comprising a sheet of originally flat material having opposed surfaces, said material having a plurality of spaced generally parallel score lines formed therein defining a plurality of panels, at least one non-resilient wire extending through the material intermediate its opposed surfaces and in a direction generally transverse to said score lines, one of said panels serving as a base, at least some of the other panels of said material serving as display portions adapted to have design material formed thereon, said base portion and the non-resilient wire bent at a first pre-determined angle to the other panels, the remaining panels with the non-resilient wire bent at various angles with respect to each other, said first pre-determined angle selected so the base portion will serve as a stand for the display portions and hold them in vertical relation to the base portion without further support.

6. The article described in claim 5 wherein one of said panels is a tear out portion, said at least one non-resilient wire extending through said tear out portion to other panels whereby when said tear out portion is removed said other panels are held in vertically spaced relation to the remaining panels separated only by a portion of said at least one non-resilient wire.

References Cited in the file of this patent
UNITED STATES PATENTS

| | | |
|---|---|---|
| 1,497,456 | List | June 10, 1924 |
| 1,914,845 | Cook | June 20, 1933 |
| 2,205,262 | Hayes | June 18, 1940 |
| 2,593,592 | Miller | Apr. 22, 1952 |
| 2,695,097 | Easton | Nov. 23, 1954 |
| 3,015,898 | Keeslar | Jan. 9, 1962 |